United States Patent [19]

Schmatz

[11] Patent Number: 4,847,171
[45] Date of Patent: Jul. 11, 1989

[54] MOLYBDENUM OXIDE ELECTRODES FOR THERMOELECTRIC GENERATORS

[75] Inventor: Duane J. Schmatz, Dearborn Heights, Mich.

[73] Assignee: Ford Motor Company, Dearborn, Mich.

[21] Appl. No.: 166,133

[22] Filed: Mar. 10, 1988

[51] Int. Cl.$^4$ ............................................. H01M 10/39
[52] U.S. Cl. ...................................... 429/11; 429/104; 29/623.5
[58] Field of Search .................. 429/11, 104, 31, 191, 429/193; 29/623.5

[56] References Cited

U.S. PATENT DOCUMENTS

| | | |
|---|---|---|
| 3,458,356 | 5/1966 | Kummer et al. |
| 3,856,647 | 12/1974 | Blachman ............................ 204/192 |
| 4,042,757 | 8/1977 | Jones ................................... 429/104 |
| 4,049,877 | 9/1977 | Saillant et al. ......................... 429/11 |
| 4,175,164 | 11/1979 | Cole ........................................ 429/11 |
| 4,253,931 | 3/1981 | Gold et al. .................... 204/192 SP |
| 4,509,254 | 4/1985 | Damrow et al. .................... 429/104 |
| 4,510,210 | 4/1985 | Hunt ....................................... 429/11 |
| 4,661,229 | 4/1987 | Hemming et al. ............. 204/192.13 |

FOREIGN PATENT DOCUMENTS 0081873  5/1984  Japan .................... 429/193

*Primary Examiner*—Donald L. Walton
*Attorney, Agent, or Firm*—Lorraine S. Melotik; Roger L. May

[57]  ABSTRACT

The invention is directed to a composite article suitable for use in thermoelectric generators. The article comprises a thin film comprising molybdenum oxide as an electrode deposited by physical deposition techniques onto solid electrolyte. The invention is also directed to the method of making same.

10 Claims, 2 Drawing Sheets

MOLYBDENUM OXIDE ELECTRODES FOR THERMOELECTRIC GENERATORS

The invention disclosed herein was made under, or in the course of Department of Energy Contract No. DE-AC02-CE40651.

TECHNICAL FIELD

This invention relates to a composite article comprising a thin film comprising molybdenum oxide as an electrode on solid electrolyte, which article is suitable for use in thermoelectric generators.

BACKGROUND OF THE INVENTION

Thermoelectric generator devices convert heat energy from a heat source directly to electrical energy. In one type of thermoelectric generator, the electrical energy is generated by electrochemically expanding alkali metal across a solid electrolyte. Such generators, wherein sodium metal is employed as the working substance, have been described in U.S. Pat. Nos. 3,458,356 and 4,510,210, and are commonly referred to as "sodium heat engines" (referred to herein as "SHE"). This type of thermoelectric generator is discussed herein as exemplary of one type of generator in which the article of this invention may be suitably used.

The sodium heat engine generally comprises a closed container separated into a first and second reaction zone by a solid electrolyte. Liquid sodium metal is present in the first reaction zone (i.e., on one side of the solid electrolyte). In the second reaction zone (i.e., on the other side of the solid electrolyte), a permeable, electrically conducting electrode is in contact with the solid electrolyte. During operation of such a device, a heat source raises the temperature of liquid sodium metal within the first reaction zone to a high temperature and corresponding high vapor pressure, which creates a sodium vapor pressure difference across the solid electrolyte. In response to this pressure difference, the elemental sodium gives up electrons to the negative electrode in contact with the sodium metal and the resulting sodium ions migrate through the solid lectrolyte. The electrons, having passed through an external load, neutralize sodium cations at the permeable, positive electrode-solid electrolyte interface. Elemental sodium metal evaporates from the permeable electrode and migrates through the low pressure second reaction zone to a low temperature condenser. The condensed liquid sodium may then be returned back to the higher temperature first reaction zone.

In the thermoelectric generator system just described, the electrode on the surface of the electrolyte from which the alkali metal ions emerge is a positive electrode and must be present in order to transfer electronic charge from the external circuit to the alkali metal ions. This completes the electrochemical circuit required for operation of the generator. The operation of such thermoelectric generator systems require electrodes possessing special properties, some of which are difficult to optimize simultaneously. For example, it is necessary for efficient generator operation that the positive electrode conduct electrons from the electrical load to a broad surface of the electrolyte, doing so with low electrical resistance. At the same time, it is also necessary for the positive electrode to permit the passage of alkali metal atoms from the electrolyte-electrode interface through the electrode to the opposite electrode surface, from which they may pass to the condenser. While the former requirement is more likely to be attained by dense, thick electrodes to promote low resistance, the latter requirement suggests thin, permeable electrodes to promote the easy passage of the alkali metal through the electrode. Additionally, the electrodes must be relatively unreactive with the alkali metal and have low vapor pressure to prevent their loss through evaporation in the high temperature, high vacuum environment in which they operate. Still further, the electrode material must have a thermal expansion coefficient offering a fair match to that of the electrolyte substance. This is necessary in order to prevent delamination of the electrode from the electrolyte which could result from differential expansion and contraction of the electrode and electrolyte materials during the heating and cooling cycles to which such systems are exposed during use.

U.S. Pat. No. 4,049,877, to Saillant et al, is directed to a thermoelectric generator wherein the improvement comprises employing, as the electrode, a porous metal film deposited on the solid electrolyte by chemical deposition specifically chemical deposition. Among the metals taught as suitable for use as the electrode are molybdenum, tungsten, chromium, nickel and iron. Cole, in U.S. Pat. No. 4,175,164, teaches that the surface configuration of metal electrodes formed, e.g., by chemical deposition techniques (such as those in the above Saillant et al patent) may be modified by subsequently exposing such deposited electrodes to oxidizing conditions, followed by reducing conditions. It is suggested by Cole that these conditions effect an oxidation, reduction and consequent redeposition in the already deposited electrode material, e.g., molybdenum, and modify the surface configuration which makes it desirably more porous, thus providing improved electrode efficiency. Both of these patents are commonly assigned with this application. Sodium heat engines having the metal electrodes of Cole, while being capable of excellent Power and efficiency in the initial stages of operation, have shown a tendency to lose power with operating time at high temperatures.

DISCLOSURE OF THE INVENTION

This invention is directed to an article suitable for use in thermoelectric generators. The article comprises a thin film electrode comprising molybdenum oxide on solid electrolyte, wherein the electrode has a thickness between about 0.5 and about 10 $\mu$m (microns). The electrode is deposited on the solid electrolyte by physical deposition of molybdenum in an atmosphere comprising at least 10% oxygen. Preferably, such physical deposition is selected from such physical deposition techniques as reactive sputtering, ion beam sputtering and ion plating. This electrode comprises a substantially uniform dispersion of molybdenum oxide in molybdenum or consists essentially of molybdenum oxide. The amount of molybdenum oxide in the electrode would depend on the percentage of oxygen in the atmosphere during the physical deposition of the molybdenum. Hereinafter, this electrode comprising molybdenum oxide in part or in total will be referred to as the "molybdenum oxide electrode". A layer of molybdenum, preferably having a thickness between about 10 and about 1000 Angstroms, may be present between the molybdenum oxide electrode and the solid electrolyte and/or on top of the molybdenum oxide electrode. The invention is also directed to methods for making the article described above.

The novel electrode materials of the present invention exhibit the aforementioned properties desired for thermoelectric generators. While not wishing to be bound by theory, it is believed that the molybdenum oxide of the invention electrode advantageously reacts with the sodium of the cell to form sodium molybdates within the bulk of the electrode, which molybdates are molten at the cell operating temperature. Such liquid phases provide both a conducting Path for the diffusion transport of neutral sodium and good physical contact between electrode and electrolyte. In the molybdenum electrodes of Cole discussed above, it is believed that in the presence of sodium and oxygen (from the oxidizing conditions), sodium molybdates may be formed on the molybdenum electrode surface and in its pores, resulting in the excellent initial power of the Cole electrodes. However, the electrode surface is exposed to high vacuum (to facilitate evaporation of the sodium formed at the electrode/electrolyte interface) and molybdates have a significant vapor pressure at cell operating temperatures. It is thus believed that in the Cole electrode the molybdates formed at the molybdenum surface and in its Pores evaporate rapidly, leaving a solid, less permeable molybdenum electrode. The loss of these liquid phases through evaporation or decomposition occurs in a matter of 50-150 hours and lead to a decrease in power output to less than one-third or more of the initial output.

In the Present invention electrode, the electrode is formed by Physical deposition of molybdenum in an atmosphere comprising at least 10% oxygen, wherein oxygen is uniformly incorporated within the bulk of the electrode as some form of molybdenum oxide, most probably $MoO_3$. This would not occur in the Cole electrode because an already deposited molybdenum electrode of Cole is only subsequently exposed to oxidizing conditioning. As suggested by Cole, these conditions would, at most, modify the surface characteristics. Because of the uniformity of molybdenum oxide throughout the bulk of the physically deposited electrode film of the invention, the evaporation rate of the sodium molybdates that form during operation of the cell is decreased substantially producing high power output in the cell for extended times. Embodiments of the molybdenum oxide electrodes of this invention have been tested and were found to maintain their performance for at least 1000 hours. The theory put forth as to the reason this invention electrode maintains its high power output for extended periods of time is presented only as a possible explanation and not as a limitation of the invention. Neither its understanding nor it validity is necessary for the practice of the invention.

It is an additional advantage of the present invention that the molybdenum oxide electrodes of the invention have been found to adhere well to the surface of oxide ceramics, including those known for use as the solid electrolyte in sodium heat engines, such as beta"-alumina. The use of molybdenum oxide as the electrode material allows for further enhancement of the bond at the electrode-electrolyte interface and of electrical conductivity, should such enhancement be desired, through deposition of a layer of pure molybdenum between the solid electrolyte and the molybdenum oxide. The molybdenum oxide electrode exhibits a high electronic conductivity at the 600–1000° C. operating temperatures typical for such generators.

Still further, this invention electrode is deposited by physical deposition methods, e.g., sputtering techniques, which advantageously provide an especially economical and rapid means by which to apply the molybdenum oxide electrode film. Additionally, such electrode application techniques allow for fabrication of electrode/electrolyte articles of thin cross section and/or unusual shapes.

DETAILED DESCRIPTION OF THE INVENTION

Figure 1:
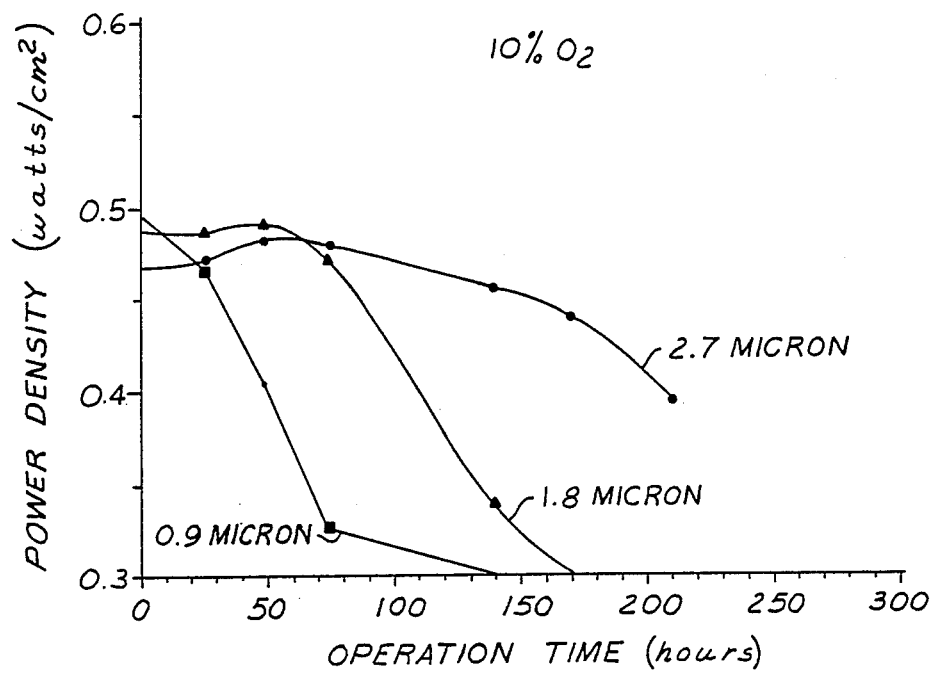
FIG. 1 is a graphical illustration showing the power density versus operation time for three SHE cells employing molybdenum oxide electrodes of different thicknesses made by physical deposition of molybdenum in a 10% oxygen atmosphere according to this invention.

The present invention article comprises a thin film electrode comprising molybdenum oxide on solid electrolyte, wherein the electrode has a thickness between about 0.5 and about 10 $\mu$m. Generally, molybdenum oxide electrodes according to this invention having a thickness of about 1 to 3 $\mu$m on a solid electrolyte are preferred since they appear to be appropriate to carry adequate current in thermoelectric generators. The electrode comprising molybdenum oxide is deposited on the solid electrolyte by physical deposition of molybdenum in an atmosphere comprising at least 10% oxygen (by volume). Such molybdenum oxide electrodes, having thickness of 1 to 3 $\mu$m and deposited in atmosphere comprising 10 to 100% oxygen, generally have a surface resistance (often termed "sheet resistance") of less than about 150 ohms/square, more generally the surface resistance is between about 0.1 and about 150 ohms/square. Many suitable physical deposition methods will be apparent to those skilled in the art in view of the present disclosure.

Exemplary of such physical deposition methods is reactive sputtering. During reactive sputtering, the molybdenum "reacts" with the oxygen to form the molybdenum oxide as it deposits onto the solid electrolyte. In reactive sputtering, a main sputtering chamber consists of a vacuum system containing a dc magnetron sputtering gun with a molybdenum target to which a large negative voltage is applied. The atmosphere in the system used in any physical deposition method according to this invention comprises at least 10% by volume oxygen and may comprise 100% oxygen. If the atmosphere comprises less than 100% oxygen, the other gas of the atmosphere is inert, preferably being argon gas. Flow meters regulate the amount of oxygen and, when employed, inert gas, admitted into the system. The vacuum pumping system can be throttled to permit operation at a prescribed pressure developed by the gas(es).

A usual operating pressure range is 1.5 to 5 millitorr, but can be as high as 20 millitorr. Gas flow rates are selected based on the size of the chamber and the pumping rate of the vacuum pumping system employed. For example, the argon flow rates for the reactive sputtering chamber of Examples 1 and 3 having a volume of 200 liters are optimally in the range of 10–28 standard cubic centimeters per minute (sccm); typically 22 sccm is used. In such cases, the reactive sputtering process begins with setting the inert gas flow rate and adjusting the pressure, after which the high voltage is turned on and the current is set. A plasma of positively charged inert gas ions is formed and ions are attracted to the negatively charged molybdenum target. Oxygen is then admitted to the system. An exchange of energy occurs between the inert gas ion and molybdenum so that a molybdenum atom is dislodged, to be redeposited, and simultaneously reacted with oxygen, on any substrate in its line of sight. In this invention, it is deposited on the solid electrolyte The solid electrolyte article is brought near the plasma at a selected distance. Generally, to produce a uniform film over an entire substrate, e.g., a solid electrolyte tube, requires that the substrate be rotated. If a 100% oxygen atmosphere is employed, as in Example 2, the steps employed to carry out the deposition would be varied, as would be apparent to those skilled in the art in view of the present disclosure. Reactive sputtering techniques are discussed in "Reactive Sputter Deposition, A Quantitative Analysis", D. K. Hohnke, D. J. Schmatz and M. D. Hurley, Thin Solid Films, 118, 301–310 (1984), which article is hereby expressly incorporated by reference for such teachings.

While one physical deposition technique, i.e., reactive sputtering, has been discussed in detail above, such discussion is not meant to limit the deposition of the molybdenum oxide onto the solid electrolyte in this invention to deposition by reactive sputtering techniques. Other physical deposition methods which are suitable for use in this invention for applying the molybdenum oxide onto the solid electrolyte are described in "Deposition Technologies for Films and Coatings", R. F. Bunshoh, Editor, Noyes Publications, Park Ridge, N.J., 1982, which text is hereby expressly incorporated by reference for its teaching relative physical deposition techniques. Still other physical deposition methods, suitable for applying the molybdenum oxide to the solid electrolyte, are known to those skilled in the art and would be apparent in view of the present disclosure. For example, the molybdenum oxide can be deposited by ion beam sputtering of a molybdenum target in an atmosphere comprising oxygen. Ion plating is still another method which may be used to deposit the molybdenum oxide and comprises using either arc or electron beam evaporation of molybdenum in an atmosphere comprising oxygen. While the molybdenum oxide may be deposited by any of numerous physical deposition methods, as described herein, the electrodes of this invention comprising molybdenum oxide are most conveniently deposited on the solid electrolyte by reactive sputtering of molybdenum metal in the presence of a controlled pressure of oxygen or oxygen/argon gas.

It appears that the largest volume of oxygen incorporated in the electrode would probably produce the longest life such electrodes are those which have the largest percent oxygen incorporated × thickness. Very thick films, however, would require long sputtering times and may provide less than optimum passage of sodium through the electrode. Thicknesses in the range of 0.5 to 10 $\mu$m can be deposited generally in commercially reasonable times and provide the enhanced SHE performance and other advantages described above. A thickness of 0.5 $\mu$m is the minimum necessary to provide adequate conductivity within the film and thicknesses over 10 $\mu$m produce less than optimum power and become economically unattractive to deposit. Electrodes formed in atmospheres having oxygen contents between 10 and 100% by volume exhibit significant improvements in performance. Thin films of optimum performance are found to be those produced by deposition with a high oxygen content sputtering gas. Because of the lower sputtering rate at high oxygen contents, thick films may be more economically produced at lower oxygen contents. Selection of the optimal thickness of an electrode and oxygen content of the deposition atmosphere to form such an electrode according to this invention would be within the skill of those in the art in view of the present disclosure. It is possible to vary the physical deposition methods and conditions of physical deposition over a considerable range while producing electrodes capable of acceptable thermoelectric generator operation.

The morphology of the deposited molybdenum oxide electrode films can be varied considerably while maintaining a molybdenum oxide/molybdenum or essentially all molybdenum oxide composition by adjusting the aforementioned parameters. It has been found that, e.g., in reactive sputtering, pressure along with the temperature affects the structure of the deposited molybdenum oxide electrode film which can, during deposition, be made more dense at lower operating pressures and higher temperatures and more porous at higher operating pressures and lower temperatures. It has further been found that, e.g., in reactive sputtering, the structure of the molybdenum oxide electrode can be made to grow with an equiaxed compact grain structure at low pressures and high temperatures and with a columnar or open fibrous structure (growth perpendicular to the solid electrolyte surface) at higher pressures and lower temperatures. It is believed that the columnar structure, with high oxide concentrations at the columnar interfaces, is more conducive to transport of the alkali metal through the molybdenum oxide film. However, while such columnar structure appears to be preferred, the invention article of this invention is not limited to such columnar molybdenum oxide electrodes.

As has been previously mentioned herein, a layer of molybdenum may be present between the molybdenum oxide electrode and the solid electrolyte. Such a layer of molybdenum enhances the bond at the electrode-electrolyte interface, should such be desired. The molybdenum can be deposited by chemical and physical deposition methods, including the physical deposition methods previously described herein for depositing the molybdenum oxide as would be apparent to those in the art in view of the present disclosure. Generally, if a layer of molybdenum is employed between the molybdenum oxide and the solid electrolyte, it is generally employed in a thickness of between about 10 and about 1000 Å (Angstroms). A layer of molybdenum can also be deposited on top of the electrode, preferably by physical deposition methods, to improve surface durability and decrease evaporation of the sodium molybdates formed in the electrode during operation. This layer may be used as an alternative to the interlayer or in addition to it. This top layer, if employed, generally would have a thickness between about 10 and about 1000 Å. Transition layers containing varying amounts of molybdenum oxide may be substituted for the thin pure molybdenum layer(s).

The solid electrolyte of the article of this invention may be selected from a wide range of glass or polycrystalline ceramic materials which are commercially available and known to those skilled in the art. Among the glasses which may be used with thermoelectric generators employing alkali metals as working substances and which demonstrate unusually high resistance to attack by alkali metal are those having one of the two following compositions: (1) between about 47 and about 58 mole percent sodium oxide, about 0 to about 15, preferably about 3 to about 12, mole percent aluminum oxide, and about 34 to about 15 mole percent silicon dioxide; and (2) about 35 to about 65, preferably about 47 to about 58, mole percent sodium oxide, about 0 to about 30, preferably about 20 to about 30, mole percent aluminum oxide, and about 20 to about 50, preferably about 20 to about 30, mole percent boron oxide. These glasses may be prepared by conventional glass making procedures using the listed ingredients and firing at temperatures of about 2700° F.

Polycrystalline ceramic materials desirable as the solid electrolyte are bi- or multi- metal oxides. Among the polycrystalline bi- or multi- metal oxides most useful in thermoelectric generators are those of beta-type-alumina, generally sodium beta-type-alumina. There are two well-known crystalline forms of beta-type-alumina materials, beta-alumina and beta''-alumina, both of which demonstrate the generic beta-type-alumina crystalline structure comprising various layers of aluminum oxide held apart by layers of Al-O bond chains with, in the case of sodium beta or beta''-alumina, sodium ions occupying sites between the aforementioned layers and columns. Among the numerous polycrystalline beta-type-alumina materials useful as the solid electrolyte are the following.

1. Standard beta-type-alumina formed from compositions comprising at least about 80 percent by weight, preferably at least about 85 percent by weight of aluminum oxide and between about 5 and about 15 weight percent, preferably between about 8 and about 11 weight percent sodium oxide. Beta-alumina is a crystalline form which may be represented by the formula $Na_2O \cdot 11Al_2O_3$. The second crystalling form, beta''-alumina, may be represented by the formula $Na_2O \cdot 5Al_2O_3$. It will be noted that the beta''-alumina form contains approximately twice as much soda (sodium oxide) per unit weight of material as does the beta-alumina form. It is the beta''-alumina crystalline form which is preferred for use as the solid electrolyte of this invention. Each of these beta-type-alumina crystalline forms can be easily identified by its own characteristic X-ray diffraction pattern.

2. Boron oxide, $B_2O_3$, modified beta-type-alumina, wherein about 0.1 to about 1 weight percent of boron oxide is added to the composition.

3. Substituted beta-type-alumina, wherein the sodium ions of the composition are replaced, in part or in whole, with other positive ions which are preferably metal ions, e.g., potassium ions, lead ions, etc.

4. Beta-type-alumina which is modified by the addition of a minor proportion by weight of metal ions having a valence not greater than 2, such that the modified beta-type-alumina composition comprises a major proportion by weight of ions of aluminum and oxygen and a minor proportion by weight of a metal ion in crystal lattice combination with cations which migrate in relation to the crystal lattice as the result of an electric field. The preferred embodiment for use in such electrical conversion devices is that wherein the metal ion having a valence not greater than 2 is either lithium or magnesium or a combination of lithium and magnesium and the cation is sodium. These metals may be included in the composition in the form of lithium oxide or magnesium oxide or mixtures thereof in amounts ranging from 0.1 to about 5 weight percent. These metal ion, e.g., lithium, are generally added to stabilize the beta''-alumina in that form. Otherwise, at high temperatures, the beta''-alumina has a tendency to convert to the beta-alumina form. It is this stabilized beta''-alumina form which is preferred for the solid electrolyte material of this invention.

The solid electrolyte is shaped so as to conform with the design considerations of the thermoelectric generator. For example, in the previously mentioned patent to Saillant et al, the solid electrolyte is a tube closed at one end. Generally, such tubes have a wall thickness of about 1 millimeter or less. The solid electrolyte of the article of this invention is, however, not limited to any particular shape. The physical deposition method described in this invention for applying the molybdenum oxide advantageously allows for applying molybdenum oxide electrodes to solid electrolytes of unusual shapes. With the advent of beta-type-alumina or other ceramics of high structural integrity, solid electrolyte wall thicknesses are as low as 100 μm or less. It has been discovered that reducing the thickness of the solid electrolyte improves overall efficiency by reduction of bulk resistance.

The following examples illustrate the preferred aspects of this invention but are not meant to limit the scope of this invention. Those in the art will appreciate that many modifications can be made within the scope of the invention that will achieve the electrode articles of this invention.

Method For Testing Power Output and Surface Resistance of Electrodes

The testing of sodium heat engine electrodes is initiated by assembling an electrolyte tube coated with a molybdenum oxide electrode into a complete sodium heat engine cell. The electrode performance is generally determined by measuring the current/voltage relationship of the electrode as a function of temperature. Electrical leads are connected to the sodium metal in the aforementioned first reaction zone of the cell, the sodium metal being the negative electrode, and to the positive electrode comprising the molybdenum oxide film carried on the solid electrolyte tube in the second reaction zone. Between these two leads, a variable resistance and a current meter are placed in series. Changes in the resistance are then used to sweep the current delivered to this circuit by the sodium heat engine system through a range of values and the current in the circuit and the cell voltage are recorded on the axes of an X-Y recorder. The maximum power output of the electrode can then be determined graphically by examination of the I-V relation. The in-plane or "surface" electronic resistance (often referred to as "sheet" resistance) of the electrode can be measured by the conventional 4 terminal methods known to those skilled in the art. Values of surface resistance are generally given in units of ohms per square, the resistance between opposite edges of a square section of the film.

EXAMPLE 1

A reactive sputtering chamber having a vacuum system, a dc magnetron sputtering gun and a molybdenum target was used to deposit a molybdenum oxide electrode film on a beta"-alumina tube in this example. The sputtering was done in a mixture of 37% oxygen and 63% argon. A flow rate of 22 cm$^3$/min (sccm) of argon was established and a pressure of 5.5 millitorr was developed in the throttled vacuum system. A current of 0.8 amperes was set which produced a cathode (target) voltage of 320 volts. Oxygen was introduced at a rate of 10 sccm and the throttle valve adjusted to maintain 5.5 millitorr pressure. Because of an interactive effect between the two gases the argon flow decreased to 17 sccm, producing 37% oxygen (by volume). When oxygen was added, the voltage increased to 480 volts. The shutter separating the tube from the plasma was opened and the tube was coated for 2.5 hours, producing a film thickness of 3 $\mu$m. This electrode produced an initial power output of 0.62 watts/cm$^2$ at 800° C. and after 700 hours of operation exhibited a power output of 0.5 watts/cm$^2$. Further testing could have continued had the test cell been refilled with sodium.

EXAMPLE 2

Reactive sputtering was employed to deposit a molybdenum oxide electrode film onto a beta"-alumina tube in this example by means of the reactive sputtering chamber described in Example 1. In this example, a 100% oxygen atmosphere was employed. A flow rate of 22 sccm of argon was established and a pressure of 5.5 millitorr was developed in a throttled vacuum system. A current of 0.8 amperes was set which produced a cathode voltage of 320 volts. Oxygen was introduced at a rate of 28 sccm and the throttle valve adjusted to maintain 5.5 millitorr pressure. Because of the interactive effect of the two gases the argon flow decreased to 0 sccm producing 100% oxygen. When oxygen was added, the voltage increased to 490 volts. The rotation of the beta"-alumina tube was started. The shutter separating the tube from the plasma was opened and the tube was coated for 2.5 hours producing a film thickness of 1.1 $\mu$m. This electrode produced a maximum power output of 0.60 watts/cm$^2$ at 800 ° C. and remained above 0.5 watts/cm$^2$ for 700 hours. Further testing could have continued had the test cell been refilled with sodium.

EXAMPLE 3

Reactive sputtering was employed to deposit a molybdenum oxide electrode film onto a beta"-alumina tube in this example by means of the reactive sputtering chamber described in Example 1. The sputtering was done in 37% oxygen and 63% argon (by volume) with a planar magnetron molybdenum target. In this example, a thin layer of pure molybdenum was deposited under and over the oxygen containing film. To begin, a flow rate of 22 sccm of argon was established and a pressure of 5.5 millitorr was developed in a throttled vacuum system. A current of 0.8 amperes was set which produced a cathode voltage of 320 volts. The rotation of the beta"-alumina tube was started and the shutter separating the tube from the plasma was opened. The tube was coated for 5 minutes (2 revolutions) producing a pure molybdenum film 0.1 $\mu$m thick. Oxygen was added at a rate of 10 sccm and the throttle valve adjusted to maintain a pressure of 5.5 millitorr. Because of the interactive effect of the two gases the argon flow decreased to 17 sccm producing an oxygen content of 37% by volume. The voltage increased to 480 volts and the deposition continued for 2.5 hours producing a film 2.5 $\mu$m thick. The oxygen flow was turned off and sputtering of pure molybdenum continued for 5 minutes (throttle valve adjusted and voltage decreased to 320 volts). A 0.1 $\mu$m overlayer of pure molybdenum was produced. A transition layer from the molybdenum to the oxygen containing layer is produce at each interface as oxygen is added or reduced. This electrode produced a maximum power output of 0.57 watts/cm$^2$ at 800° C. and remained above 0.50 watts/cm$^2$ for 700 hours. Further testing could have continued had the test cell been refilled with sodium.

EXAMPLE 4

In this example, reactive ion-plating is used to deposit a molybdenum oxide electrode onto a beta"-alumina tube. The plating is carried out in an ion plating chamber having a vacuum system comprising an electron beam. Molybdenum is vaporized from a molybdenum target by the electron beam. The vaporized molybdenum passes through a gaseous glow discharge on its way to the beta"-alumina tube, which ionizes some of the vaporized atoms. The glow discharge is produced by biasing the beta tube to a high negative potential (3KV) and admitting argon into the throttled vacuum system within the chamber at a pressure of about 20 millitorr. The tube is bombarded by high energy gas ions which effectively clean the tube surface. Oxygen is then admitted to the chamber which allows the deposition of molybdenum oxide on the beta"-alumina tube. The composition is determined by the ratio of the oxygen to the total volume of gas, (oxygen and argon). The electrode is applied to a thickness of 3 $\mu$m. The power output of the electrode is expected to be 0.60 watts/cm2 at 800° C.

EXAMPLE 5

Reactive sputtering was employed to deposit a molybdenum oxide electrode film onto three beta"-alumina tubes in varying thickness, 0.9, 1.8 and 2.7 $\mu$m, in this example by means of the reactive sputtering chamber described in Example 1. The sputtering was done essentially according to the procedure of Example 3 in 0% oxygen and 90% argon with a planar magnetron molybdenum target. These molybdenum oxide electrodes, sputtered in an argon-oxygen mixture of as little as 2.5 sccm, 10% oxygen, produced enhanced performance at 800° C. The performance varied with the thickness of the electrode film as can be seen in FIG. 1. The thinnest electrode, 0.9 $\mu$m, decreased in power output most rapidly, while the thickest electrode, 2.7 $\mu$m maintained its output the longest. The 1.8 $\mu$electrode exhibited a power-time curve between the other two electrodes.

EXAMPLE 6

Figure 2:
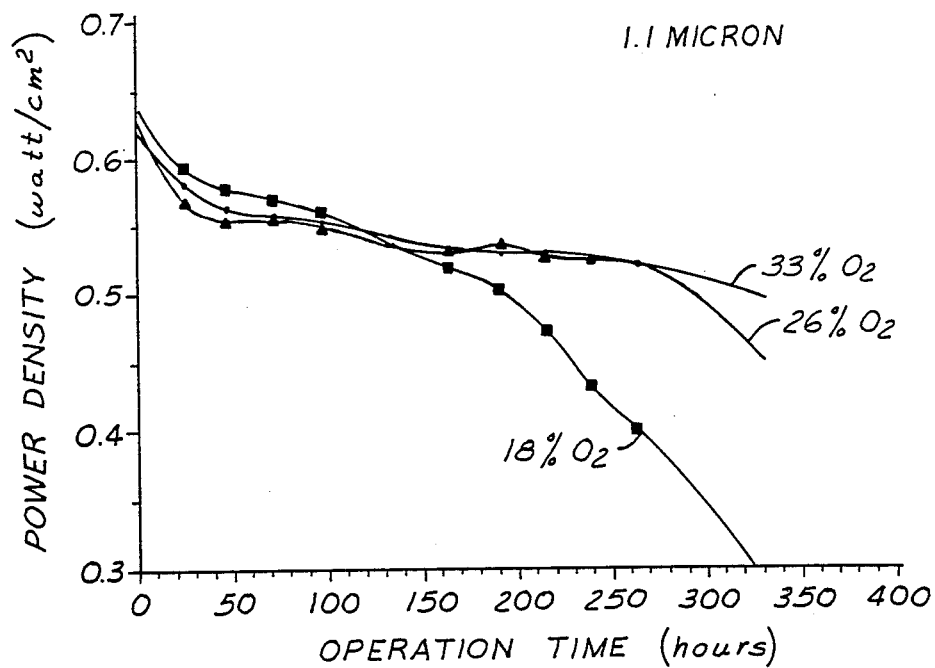
FIG. 2 is a graphical representation showing the power density versus operation time for three SHE cells employing molybdenum oxide electrodes of 1.1 $\mu$m thickness made by physical deposition of molybdenum in atmospheres comprising 18%, 26% and 33% oxygen according to this invention.

Reactive sputtering was employed to deposit a molybdenum oxide electrode film onto three beta"-alumina tubes in this example by means of the reactive sputtering chamber described in Example 1. The sputtering was done according to the procedure of Example 3 but at 18%, 26% and 33% oxygen (by volume). Electrodes made at 26% and 33% oxygen exhibited extended lives, as compared to those made at 18% oxygen, with high power outputs at 800° C. as can be seen from FIG. 2. Increased life was obtained when more oxygen was added to the sputtering gas even with relatively thin (1.1 μm) electrodes.

EXAMPLE 7

Figure 3:
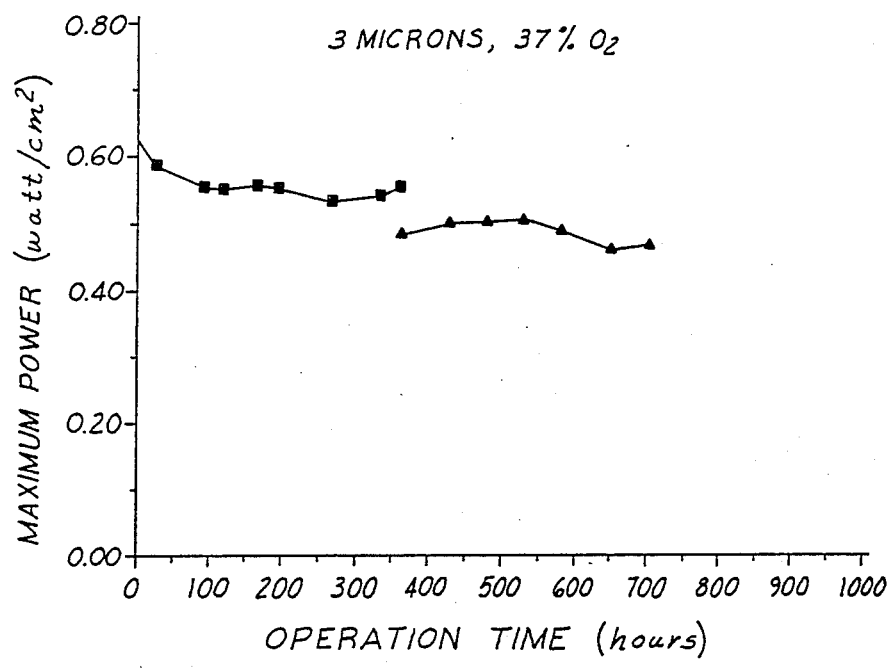
FIG. 3 is a graphical representation showing maximum power versus operating time for a SHE cell employing a 3 micron thick molybdenum oxide electrode made by physical deposition of molybdenum in an atmosphere comprising 37% oxygen according to this invention.

Reactive sputtering was employed to deposit molybdenum oxide electrode films of varying thickness onto three beta"-alumina tubes in this example by means of the reactive sputtering chamber and procedure described in Example 1. Electrodes made with 37% oxygen and 63% argon (by volume) at the three thicknesses, 1, 3, and 6 μm, Produced nearly equal power outputs, (the 3 μm exhibited somewhat higher power), and performance remained high through 700 hours. The performance of the 3 μm thick electrode is shown in FIG. 3. It produced an excellent initial power (0.62 watts/cm2 at 800° C.), and also maintained 90% of this power output for 350 hours at which time the test was interrupted due to depletion of sodium in the cell. Testing was carried further, to 700 hours, by refilling the cell with sodium. As with all molybdenum-based electrodes, exposure to air produces a decrease in performance due to reaction of the residual sodium in the electrode with moisture from the atmosphere. Nevertheless, when the cell was restarted, a power output of 0.5 watts/cm$^2$ was obtained at 800° C. which is 80% of the initial value. It remained near that level, 0.47 watts/cm$^2$ minimum, for an additional 350 hours. Further testing could have continued had the test cell been refilled with sodium.

EXAMPLE 8

Reactive sputtering was employed to deposit a molybdenum oxide electrode film onto beta"-alumina tubes in this example by means of the reactive sputtering chamber described in Example 1. Electrodes made at 62.5% and 100% oxygen at thicknesses of 2.0 and 1.1 μm, respectively, essentially according to the procedure of Example 2, exhibited equally good performance as compared to lower oxygen content electrodes. The electrode made at 100% oxygen was approximately one-half the thickness of that made with 62.5% oxygen, (identical times), due to the decrease in the rate of sputtering with increasing oxygen content of the sputtering gas. These electrodes produced maximum power outputs of 0.58 and 0.60 watts/cm$^2$ at 800° C. and remained above 0.50 watts/cm$^2$ for 700 hours. Further testing could have continued had the test cell been refilled with sodium.

We claim:

1. An alkali metal thermoelectric generator device which comprises an article comprising a solid electrolyte and a film comprising molybdenum oxide adhering to the surface of said solid electrolyte, said film (a) having a thickness between about 0.5 and about 10 mm and (b) having been deposited on said solid electrolyte by physical deposition of molybdenum in an atmosphere comprising at least about 10% oxygen.

2. The device in accordance with claim 1, wherein said article further comprises (i) a thin layer of molybdenum between said film and said solid electrolyte, (ii) a thin layer of molybdenum on the surface of said film, or (iii) a thin layer of molybdenum between said film and said solid electrolyte and a thin layer of molybdenum on the surface of said film.

3. The device according to claim 2, said film (a) having a thickness between about 10 and about 1000 Angstroms.

4. The device in accordance with claim 1, wherein said molybdenum oxide has been deposited onto said solid electrolyte by a physical deposition method selected from (i) reactive sputtering of molybdenum in an atmosphere comprising oxygen, (ii) ion plating of molybdenum in an atmosphere comprising oxygen, and (iii) ion beam sputtering of molybdenum in an atmosphere comprising oxygen.

5. The device according to claim 1, wherein said solid electrolyte comprises beta-type-alumina.

6. The device according to claim 1, wherein said solid electrolyte comprises beta"-alumina.

7. An alkali metal thermoelectric generator device comprising an article which comprises a solid electrolyte and a film comprising molybdenum oxide adhering to the surface of said solid electrolyte, said film (a) having a thickness between about 0.5 and about 10 mm and (b) having been deposited onto said solid electrolyte by reactive sputtering of molybdenum in an atmosphere comprising at least 10% oxygen, and said solid electrolyte comprising beta-type-alumina.

8. The device according to claim 7, wherein said article further comprises (i) a thin layer of molybdenum between said film and said solid electrolyte, (ii) a thin layer of molybdenum on the surface of said film, or (iii) a thin layer of molybdenum between said film and said solid electrolyte and a thin layer of molybdenum on the surface of said film.

9. The device according to claim 8, wherein said layer of molybdenum has a thickness between about 10 and about 1000 Angstroms.

10. The device according to claim 7, wherein said solid electrolyte comprises beta"-alumina.

* * * * *